United States Patent

[11] 3,589,611

| [72] | Inventor | John B. Jones, Jr.<br>5115 East Iliff Ave., Denver, Colo. 80222 |
|---|---|---|
| [21] | Appl. No. | 804,616 |
| [22] | Filed | Mar. 5, 1969 |
| [45] | Patented | June 29, 1971 |

[54] DISTRIBUTORS FOR INJECTING FLUIDS INTO VESSELS
8 Claims, 5 Drawing Figs.

[52] U.S. Cl. ................................................. 239/132,
239/132.3, 239/550, 239/559, 239/567
[51] Int. Cl. ......................................................... B05b 1/24
[50] Field of Search ............................................ 239/450,
132.3, 132, 559, 567, 139, 271, 272, 550; 62/55

[56] References Cited
UNITED STATES PATENTS

| 1,045,469 | 11/1912 | Zandt | 239/559 |
| 2,385,107 | 9/1945 | Scherl | 239/567 |
| 2,702,080 | 2/1955 | Gee | 239/132.3 |
| 3,386,256 | 6/1968 | Alexander | 62/55 X |
| 3,386,659 | 6/1968 | Rea | 239/132 |
| 2,551,538 | 5/1951 | Hensel | 239/550 X |

FOREIGN PATENTS

| 528,233 | 10/1940 | Great Britain | 239/132.3 |

*Primary Examiner* — Lloyd L. King
*Attorney* — Richard D. Law

ABSTRACT: A fluid distributor for vessels includes a complete cooling jacket for at least the portion of the fluid distributor mounted in and exposed to the interior of a vessel, and includes shielded outlet orifices to prevent particulate material from blocking the outlets so that a free flow of the fluid may be injected into the material in the vessel from each outlet.

PATENTED JUN29 1971

INVENTOR.
John B. Jones Jr.
BY Richard D. Law
ATTORNEY

INVENTOR.
John B. Jones Jr.
BY
Richard D. Law
ATTORNEY

DISTRIBUTORS FOR INJECTING FLUIDS INTO VESSELS

In one type of vertical treatment vessels, which, of course, includes liquid-solid reactors and gas-solid reactors called vertical kilns, particulate material to be treated is normally fed into the top of the vessel, and by releasing material from the bottom of the vessel the material is made to flow as a bed through the vessel in a gravity flow. Treatment fluid may be injected into various portions of the downwardly moving bed of material for contacting the particulate matter. Such vertical vessels are preferably maintained completely full of the particulate material, and the devices for injecting fluid into the bed of material are almost completely surrounded by the particulate material if they extend into the bed. There is, therefore, established a general countercurrent flow, with the particulate material flowing from the top to the bottom vessel, and a fluid flow from the bottom and/or positions spaced upwardly therefrom toward the top of the vessel. Particulate material is controllably released from the bottom of the vessel, and off-gas or -liquid is collected near the top.

In various types of kilns, crushed rock of a variety of sizes is treated with hot gases either formed by combustion internally of the bed of rock or by combustion externally of the kiln and the hot gases of the combustion injected into the bed of rock. In all vertical vessels, including kilns, it is desirable and mandatory that all of the material in the kiln be subjected to the influence of the treating fluids. Preferably, each particle is treated to the extent necessary to completely treat each particle and no more. In kilns this is important for the rock may be overburned particularly where there is combustion in the kiln.

According to the present invention I have provided a distributor for vertical reaction vessels arranged to inject a fluid into a moving bed of solids. The distributor is completely jacketed for cooling, except for the fluid outlet orifices, and the orifices are directed downwardly and are positioned below the horizontal diameter of the distributor to prevent entry of or blocking of the orifices by particulate material. The orifices are kept clear to inject additional fluid into an ascending stream of fluid from a lower part of the vessel whereby the injected additional fluid has to turn on itself to mix with and join the upwardly directed flow, thereby forcing the additional fluid further from the injecting orifice. The orifices are diverging so that they have a tendency to be self-cleaning of solid matter which might otherwise lodge in the orifices. Further, the diverging design of the orifice tends to increase the flow rate through each orifice for given pressure drop across the orifice. This diverging design with the small side in direct communication with the manifold, also, controls the horizontal distribution of the fluid inside the distributor manifold, and the larger outside diameter of the orifices controls the velocity of fluid entering the material bed.

Included among the objects and advantages of the present invention is a fluid distributor which has at least its vessel-exposed parts completely jacketed except for outlet orifices, thereby, providing cooling fluid for all of the distributor portion inside a vertical treatment vessel.

Another object of the invention is to provide a fluid distributor for vertical treatment vessels wherein the orifices for injecting fluid into the treatment vessels lies below the maximum horizontal dimension of the distributor and preferably at a position below the angle of repose of the material to maintain the orifices open at all times.

A still further object of the invention is to provide a fluid distributor for vertical treatment vessels of a simplified construction providing a jacketed construction for cooling fluid in contact with the entire construction except for fluid outlet orifices.

These and other objects and advantages of the invention may be readily ascertained by referring to the following description and appended drawings in which.

Figure 1:
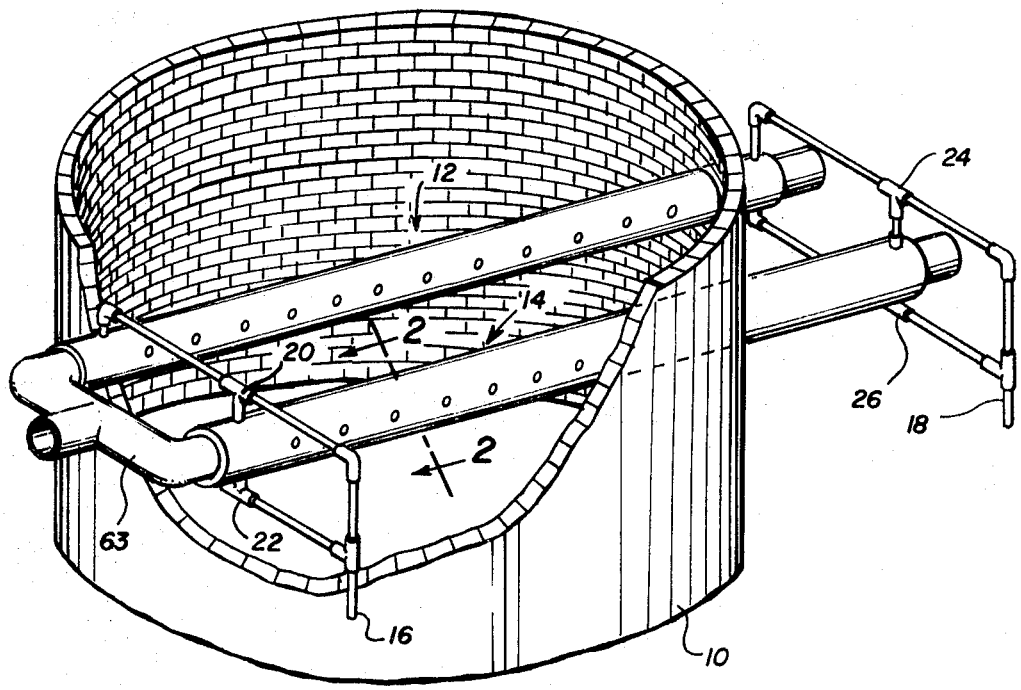
FIG. 1 is a perspective view of a portion of a vertical treatment vessel with two fluid distributors made according to the invention mounted therein.

In the embodiments selected for illustration in the drawings, a vertical vessel 10, which may be various types for treatment of solids, and the one shown is formed of a shell of material to resist the materials of the particular reaction. The one shown consists of a shell of brick, but it may be metal or the like for housing a moving bed of particulate material therethrough. A pair of distributors 12 and 14 are mounted in the vertical vessel at a level predetermined by the reaction, to inject treatment fluid from the distributors into the bed of solid material. Each of the distributors is cooled by cooling liquid from an inlet line 16 into the jacket around the distributor (described below) and the cooling liquid exhausts through an outlet line 18, from the opposite end of the distributor. For good distribution of the cooling fluid throughout the distributor an upper inlet 20 and a lower inlet 22 may be provided, and on the same basis an outlet 24 on the top of the distributor and an outlet 26 on the bottom of the distributor jacket provides means for passing a substantial quantity of the cooling fluid through the distributor. In a similar manner, the distributor 12 is provided with upper and lower inlets and outlets. Where conditions dictate a single inlet and outlet may be satisfactory for providing the volume of cooling fluid necessary for the distributor, or valves in the inlet and outlet lines provide means for controlling the cooling liquid.

A distributor according to the invention is shown in FIGS. 2—5, wherein an outer circular pipe 30 is mounted concentrically over an inner circular pipe 32. Circular pipes are preferred since they are readily available. The inner pipe is the conduit for carrying the fluid which is to be injected into the vertical treatment vessel, and the annulus between the pipes carries the cooling fluid. A plurality of longitudinal spacers 34a, 34b, 34c and 34d are welded to the inner conduit and are of a width to be slightly spaced from the outer conduit. These spacers maintain a general spacing between the inner and outer pipes and, also, provide baffling for the cooling fluid which is forced through the annulus between the inner and outer pipes. The orifices on the inner pipe are formed by drilling or the like, producing a hole 36a on one side and 36b on the other, it being understood that there are a plurality of holes spaced along the distributor and the description of the orifice or nozzle shown in FIG. 2 will illustrate the construction for all of the orifices. These nozzles are flush, nonprotruding from the outer surface of circular pipe 30. The orifices 36 may be straight sided or they may be made with a diverging wall from a smaller diameter on the inside of the pipe to larger diameter on the outside. A ring 38a is mounted in the space between the inner and outer pipes circumscribing the orifice 36a. An orifice 40a is drilled through the outer pipe in position to be concentric with the orifice 36. The ring is welded in place by a weldment 42a which provides a smooth diverging surface from the inner pipe orifice to the outlet of the orifice in the outer pipe.

The orifices in the distributor are formed at an angle to a horizontal line passing through the distributor, and the angle at which the orifices or nozzles are formed may extend from about 20° below the horizontal to about 45° below the horizontal on both sides of the distributor. The angle is generally determined by the angle of repose of the material to be treated in the kiln, and for material having a steep angle of repose a lesser angle is generally satisfactory to keep material from the orifice. As the angle of repose of the material flattens out, a greater angle, extending toward a 45° angle will be necessary for the nozzles, since less of a void is left under the distributor which is covered with the material.

Figure 3:
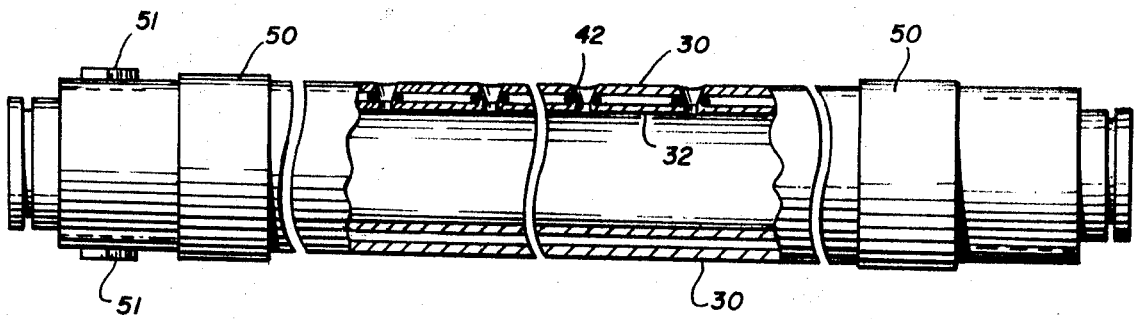
FIG. 3 is a side elevational view of a distributor according to the invention, partially broken away along section lines 3-3 of FIG. 2, to show the construction and positioning of the orifices therein.
Figure 2:
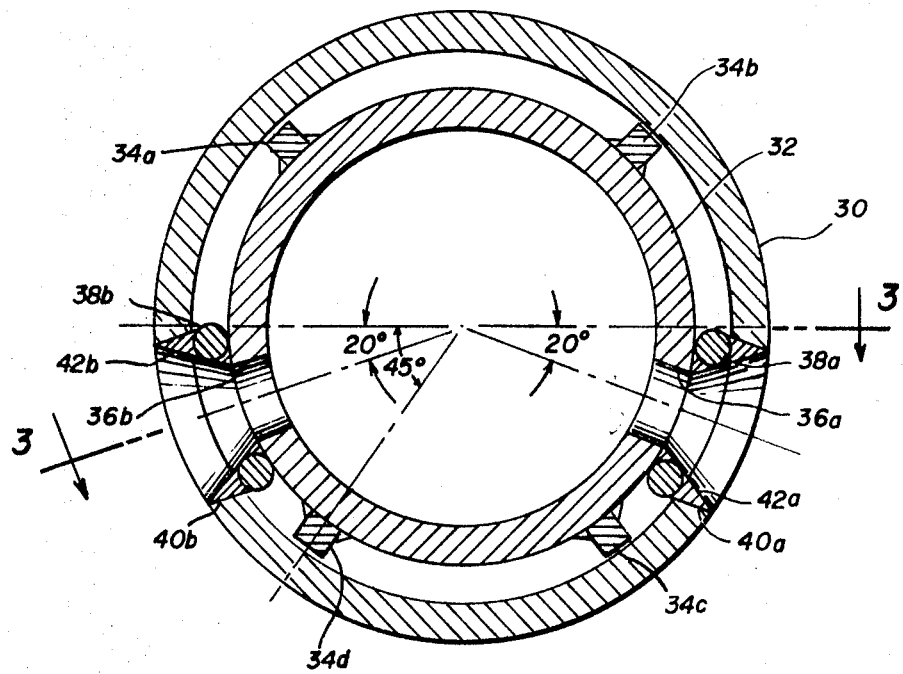
FIG. 2 is a cross-sectional elevational view of a distributor taken along section lines 2-2 of FIG. 1.
Figure 4:
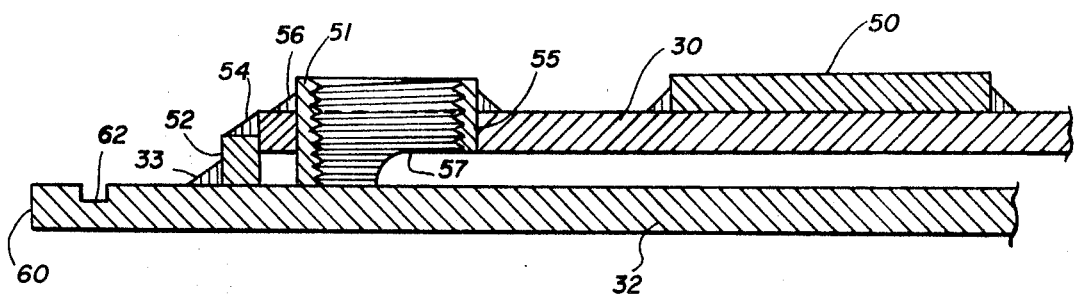
FIG. 4 is a detailed view of one end of a distributor illustrating the construction of the jacket.
Figure 5:
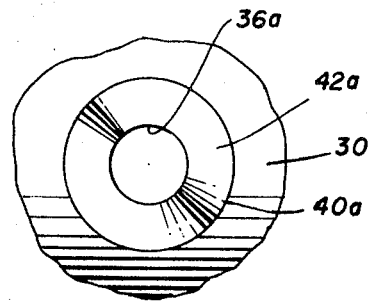
FIG. 5 is detailed plan view of an orifice taken at right angles to centerline of an orifice showing a portion of the surrounding pipe around the orifice.

One form of an end construction for the distributor is shown in FIGS. 3 and 4, wherein the outer pipe 30 has an annular reinforcing member or sleeve 50 welded thereto to provide reinforcing means at the point where the distributor passes through the wall of a vertical vessel. The end of the outer pipe 30 is sealed to the inner pipe by means of an annular ring 52 welded in place by a weldment 33 which secures the ring to the inner pipe a weldment 54 which closes the end of the pipe 30. For inlet and outlet cooling fluid fixtures a coupling 51 is fitted in a bore 55 through the outer pipe and is welded in place by a weldment 56 which extends annularly around the coupling. The bottom of the coupling has a cutout 57 to provide communication from the coupling into an annular space between the inner and outer pipes. The end 60 of the inner pipe 32 may be provided with a groove 62 or threads, flanges or the like, arranged for the connection of the pipe with a manifold, for example, a T-manifold 63 of FIG. 1. The manifold is in turn connected with a supply line (not shown) for fluid to be injected into the distributor. By providing baffling in the annulus between the inner and outer pipes, cooling fluid may be injected and withdrawn from the distributor at one end or by one connection at each end, thereby simplifying the piping of the vertical vessel, and, also, prevent channeling of cooling fluid.

The spacing of the nozzles along the length of the distributor is determined by the materials and the reaction in the vessel. For limekilns, for example, using a 6-inch inner pipe for the distributor, nozzles spaced on 6-inch centers and directed downwardly below the horizontal diameter thereof at about 20° has been found satisfactory. In other vessels the spacing of the nozzles may be as low as 3 inches or they may be variably spaced along the distributor. The angle at which the nozzles are mounted below the horizontal diameter, as pointed out above, may extend from about 20° and to as much as 45° below the horizontal. In some instances, it is preferable that the nozzle be above the lowest point where the material seals against the pipe, below the horizontal maximum diameter, particularly where the reaction includes a combustion which occurs in the bed in the vessel. This, of course, reduces the chance of combustion occurring in the void space below the distributor. The diverging nozzle has a tendency to clean itself of solid material that might become lodged therein and it further tends to increase the flow rate through the nozzle for a given pressure drop across the nozzle. Where a combustion is the treatment for the material in the kiln, it is desirable to have the fluid velocity from each nozzle at its optimum for high efficiency under all conditions of operation. This velocity must be sufficient to keep ignition from occurring in the nozzle, and further, it is desirable in some instances to have the flow sufficient to delay ignition until the fluid has penetrated several average diameters of the particles in the bed.

It is readily seen from the drawings and the description that all of the exposed metal parts of the distributor are wetted on the inside by the cooling fluid. This provides a distributor which will have an extended life and at the same time will minimize the cooling water requirements.

The assembly of the outer pipe on the inner pipe is facilitated by splitting the outer pipe into two halves. Blocks, which are drilled for the orifices, or rings may be welded in place on the inner pipe over openings therein. The flanges or spacers are then welded onto the inner pipe. The halves of the outer pipe are perforated to provide holes which mate with the blocks or rings. These halves are placed around the inner pipe and both seams are welded, a conventional process for welded pipe. Each block is then welded to outer pipe at each hole completing the assembly.

The invention relates to pipes for conveying fluids and while the description concerns round pipes, such other shapes as oval, hexagonal, etc. are useful for the distributor. With such pipes, the split outer pipe provides a satisfactory method of assembly. Also, using a tube as the orifice, with a length which is equal to 2 or 3 times the diameter of the tube, increases the amount of fluid which passes the particular size of orifice. The additional length of tube would extend into the inner pipe rather than on the outside in the vessel in which the unit is assembled. A single row of orifices on the bottom of the pipe may be useful in certain systems.

I claim:

1. A distributor for introducing treatment fluids into a vertical reaction vessel comprising
   a. a length of pipe,
   b. a pipe concentrically mounted over said length of pipe forming a cooling-fluid-holding annulus around said length of pipe,
   c. inlet and outlet means for introducing and withdrawing cooling fluid from said annulus,
   d. there being a plurality of orifices in said length of pipe and mating orifices in said pipe inclusive of bridging means between said orifices to form a plurality of outlets for said length of pipe through said concentric pipe,
   e. each said outlet being below the maximum horizontal diameter of said pipes and each having a cross-sectional area substantially less than the cross-sectional area of said length of pipe,
   f. each said outlet being flared outwardly and each said orifice having its outlet flush with the outer surface of said concentric pipe, and
   g. means for introducing fluid into said length of pipe for distribution through said outlets.

2. A distributor according to claim 1 wherein a series of baffles longitudinally extending along said pipe are mounted in said annulus to direct a flow of fluid therein and to space said pipes apart.

3. A distributor according to claim 1 wherein said orifices are formed in opposed series on opposite sides of said pipes and each orifice is positioned and directed downwardly below said maximum horizontal diameters at an angle of from 20°—45°.

4. A distributor according to claim 1 wherein said bridging means includes a ring placed in the space between each said orifice in said length of pipe and each mating orifice in said concentric pipe and wall means being secured to said ring extending from the inner each orifice in said length of pipe to each mating orifice in said concentric pipe.

5. A distributor according to claim 1 wherein said pipes are cylindrical.

6. A distributor according to claim 4 wherein a weldment secured to said ring forms said wall means.

7. A distributor according to claim 1 wherein each said orifice in said length of pipe is a cylindrical bore.

8. A distributor according to claim 7 wherein said bridging means for each outlet includes wall means extending from the outside of said cylindrical bore, flared outwardly to the outside of said concentric pipe forming a flared outlet from said length of pipe.